US010230792B2

(12) United States Patent
Engbersen et al.

(10) Patent No.: US 10,230,792 B2
(45) Date of Patent: Mar. 12, 2019

(54) SYNCHRONIZING PROPRIETARY DATA IN AN EXTERNAL CLOUD WITH DATA IN A PRIVATE STORAGE SYSTEM

(71) Applicant: International Business Machines Corporation, Armonk, NY (US)

(72) Inventors: Ton Engbersen, Rueschlikon (CH); Martin Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 14/921,790

(22) Filed: Oct. 23, 2015

(65) Prior Publication Data
US 2017/0118279 A1    Apr. 27, 2017

(51) Int. Cl.
G06F 7/00      (2006.01)
H04L 29/08     (2006.01)
G06F 17/30     (2006.01)

(52) U.S. Cl.
CPC .... H04L 67/1095 (2013.01); G06F 17/30575 (2013.01); H04L 67/10 (2013.01); G06F 17/30581 (2013.01)

(58) Field of Classification Search
USPC ...................................................... 707/620
See application file for complete search history.

(56) References Cited

U.S. PATENT DOCUMENTS 8,880,474 B2    11/2014  Mason et al.
9,015,114 B2*    4/2015  Chatterjee ........... H04L 41/5041
                                                  707/610
9,229,905 B1*    1/2016  Penilla .................... G06F 17/00
9,262,435 B2*    2/2016  Vibhor ................ H04L 29/0854
9,413,852 B2*    8/2016  Lawson ............. G05B 19/4185
9,734,224 B2*    8/2017  Chatterjee ........... H04L 41/5041
9,910,906 B2*    3/2018  Karve ............... G06F 17/30575

(Continued)

OTHER PUBLICATIONS

Zhang et al., "ViewBox: Integrating Local File Systems with Cloud Storage Services", Proceedings of the 12th USENIX Conference on File and Storage Technologies (FAST'14), Feb. 17-20, 2014, Santa Clara, CA, USA, pp. 119-132.

(Continued)

*Primary Examiner* — Eliyah S. Harper
(74) *Attorney, Agent, or Firm* — Scully, Scott, Murphy & Presser, P.C.; Daniel Morris, Esq.

(57) ABSTRACT

The present invention is notably directed to a method for synchronizing proprietary data in an external cloud provided by a cloud service provider with data of a private storage system. The method comprises, at a synchronization system: copying outward data from a flow of outward data sent from a private cloud to the external cloud, the outward data being proprietary data of an entity that owns data of the private cloud. Next, and in parallel to copying outward data: the synchronization system compares copied outward data with data stored on the private storage system, to determine whether the compared outward data are already replicated in the private storage system. Finally, if it is determined that the compared outward data are not yet replicated in the private storage system, it instructs to store the compared outward data on the private storage system. The present invention is further directed to related systems and computer program products.

13 Claims, 3 Drawing Sheets

(56) References Cited

U.S. PATENT DOCUMENTS

| | | |
|---|---|---|
| 2012/0166576 A1 | 6/2012 | Orsini et al. |
| 2013/0138810 A1 | 5/2013 | Binyamin et al. |
| 2013/0305039 A1 | 11/2013 | Gauda |
| 2014/0074788 A1* | 3/2014 | Chatterjee ............ H04L 41/5041 |
| | | 707/639 |
| 2014/0201144 A1* | 7/2014 | Vibhor ................ H04L 29/0854 |
| | | 707/634 |
| 2015/0052392 A1 | 2/2015 | Mickens et al. |
| 2015/0278245 A1* | 10/2015 | Sagar ................ G06F 17/30174 |
| | | 707/610 |
| 2016/0064036 A1* | 3/2016 | Chen ..................... H04L 9/3242 |
| | | 386/241 |
| 2016/0378844 A1* | 12/2016 | Karve ............... G06F 17/30575 |
| | | 707/620 |
| 2017/0091208 A1* | 3/2017 | Quan ..................... G06F 17/30 |

OTHER PUBLICATIONS

Van Der Merwe et al., "Towards a Ubiquitous Cloud Computing Infrastructure", 17th IEEE Workshop on Local and Metropolitan Area Networks (LANMAN), 2010, May 5-7, 2010, pp. 1-6.

* cited by examiner

SYNCHRONIZING PROPRIETARY DATA IN AN EXTERNAL CLOUD WITH DATA IN A PRIVATE STORAGE SYSTEM

BACKGROUND

The invention relates in general to methods for easing the migration of resources from one cloud to another. The solutions proposed relate in particular to methods for replicating data stored on an external cloud on a private storage system. The invention further relates to computerized systems, clouds comprising such computerized systems and computer program products.

A cloud is a set of computer resources organized in such a way that the owner of the resources may dynamically allocate part or all of those resources to users, e.g., for a fixed period of time.

A private cloud is a cloud in which the user and owner belong to the same organization while in an external cloud, e.g., a public cloud, the user and owner belong to a different organization. The cloud infrastructure is operated solely for an organization. It may be managed by the organization or a third party and may exist on-premises or off-premises. Private clouds are preferred when owners or users do not wish to have their computation performed on the infrastructure of a third party, e.g., for reasons of security or reliability. Private clouds have the disadvantage of being inelastic, i.e., the amount of resources that can be allocated to a task is bound by the total amount of resources in the private cloud, which is likely more limited than the amount of resources in a public cloud.

An external cloud as meant herein is typically a public cloud. A public cloud infrastructure is made available to the general public or a large industry group and is owned by an organization selling cloud services. However, an external cloud as understood herein may also be another private cloud, e.g., having typically more resources than the enterprise private cloud. It may for instance be a Virtual Private Cloud, i.e., a configurable pool of shared computing resources allocated within a public or external cloud environment, and providing some isolation between the different users of such resources.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Cloud principles are getting more and more attraction. However, one unsolved issue with leveraging clouds relates to the data locality. For example, if a company or an enterprise is running (parts of) its solutions in an external cloud, then corresponding data are inherently moved to the external cloud as well. The daily data transport to the external cloud is usually not a problem as it happens step-by-step, file after file, etc.

However, as it may be realized, if all (or a substantial part of all) the proprietary data needs to integrally return, at some point in time, back to the company (e.g., when changing the cloud provider, or sourcing back in, etc.), then the data volume may typically be significantly too big to be moved in a reasonable amount of time. For example: the transfer a moderate amount of 100 TB of data over a well sized 100 Mbps Ethernet line already takes more than 90 days. Since many companies own and manage hundreds or more of terabytes, while having Internet connections that are often less than 100 Mbps, the actual durations needed to migrate company-wide data is multiplied to an extent where it cannot reasonably be handled.

Cloud providers may provide solutions to this problem. However, such solutions depend on the cloud provider, rather than the companies who need them, and may be onerous.

SUMMARY

According to a first aspect, the present invention is embodied as a method for synchronizing proprietary data in an external cloud provided by a cloud service provider with data of a private storage system. The method comprises, at a synchronization system: copying outward data from a flow of outward data sent from a private cloud to the external cloud, the outward data being proprietary data of an entity that owns data of the private cloud. Next, and in parallel to copying outward data: the synchronization system compares copied outward data with data stored on the private storage system, to determine whether the compared outward data are already replicated in the private storage system. Finally, if it is determined that the compared outward data are not yet replicated in the private storage system, it instructs to store the compared outward data on the private storage system.

A partly similar scheme may be implemented to replicate inward data (i.e., data read back from the external cloud). The inward/outward data are typically copied from a flow of data meant to/arising from several nodes of the private cloud. In addition, adequate monitoring may be provided, e.g., as part of the provider's services to monitor proprietary data indirectly generated in the external cloud (i.e., on behalf or for said entity).

Thus, if migration of resources from one external cloud to another is required, the migration may controllably be handled by the proprietary entity by replicating data stored on said private storage system in the new external cloud.

According to other aspects, the invention is embodied as a data synchronization system, implementing principles such as described above. The invention may also be embodied as a private cloud comprising such a system.

According to a final aspect, the invention is embodied as a computer program product, comprising program instructions executable by a synchronization system such as described above.

Computerized systems, methods, and computer program products embodying the present invention will now be described, by way of non-limiting examples, and in reference to the accompanying drawings.

BRIEF DESCRIPTION OF SEVERAL VIEWS OF THE DRAWINGS

Similar or functionally similar elements in the figures have been allocated the same numeral references, unless otherwise indicated.

DETAILED DESCRIPTION OF EMBODIMENTS OF THE INVENTION

The following description is structured as follows. First, general embodiments and high-level variants are described (sect. 1). The next section addresses more specific embodiments and technical implementation details (sect. 2).

1. General Embodiments and High-level Variants

Figure 1:
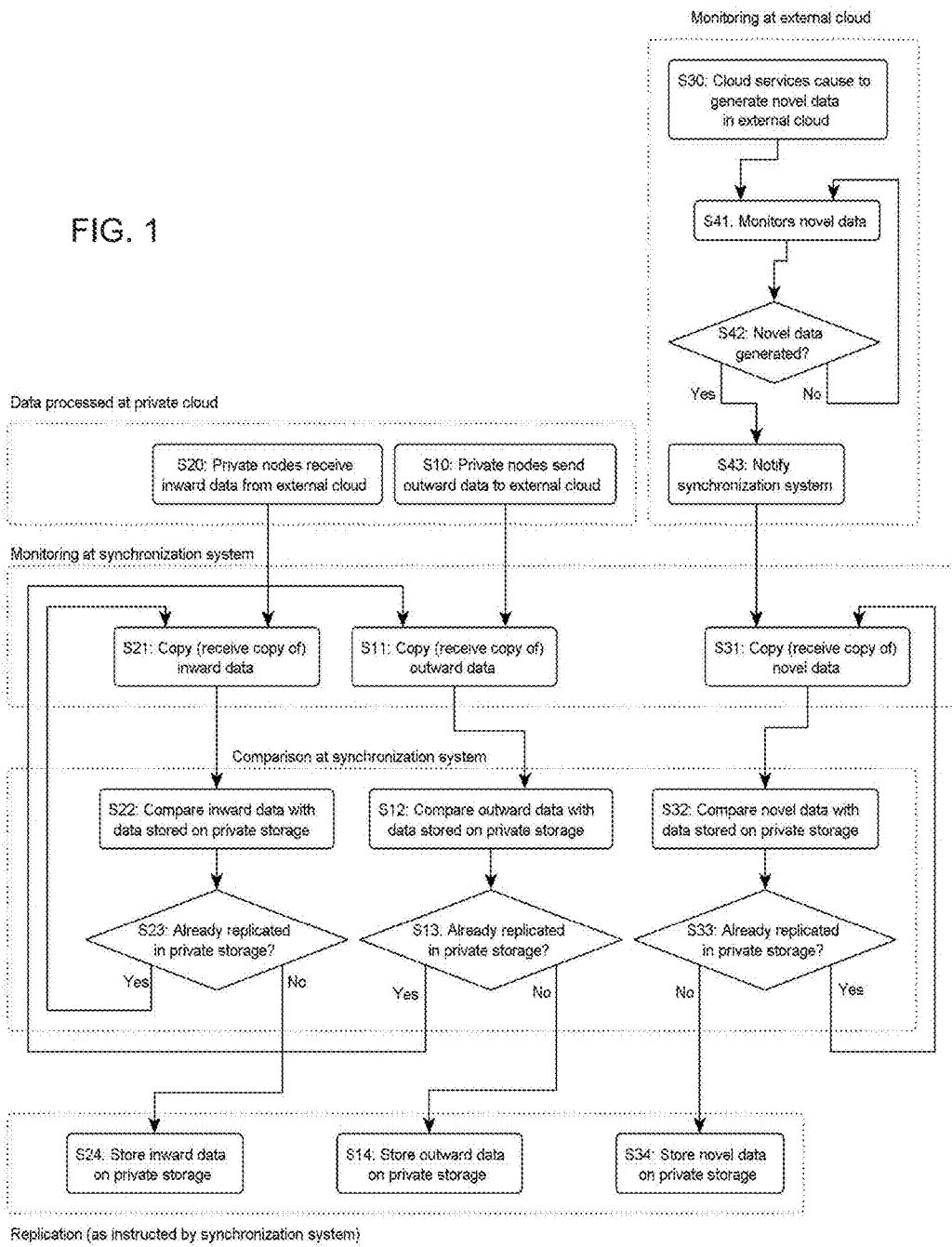
FIG. 1 is a flowchart illustrating high-level steps of a method of synchronization according to embodiments.
Figure 2:
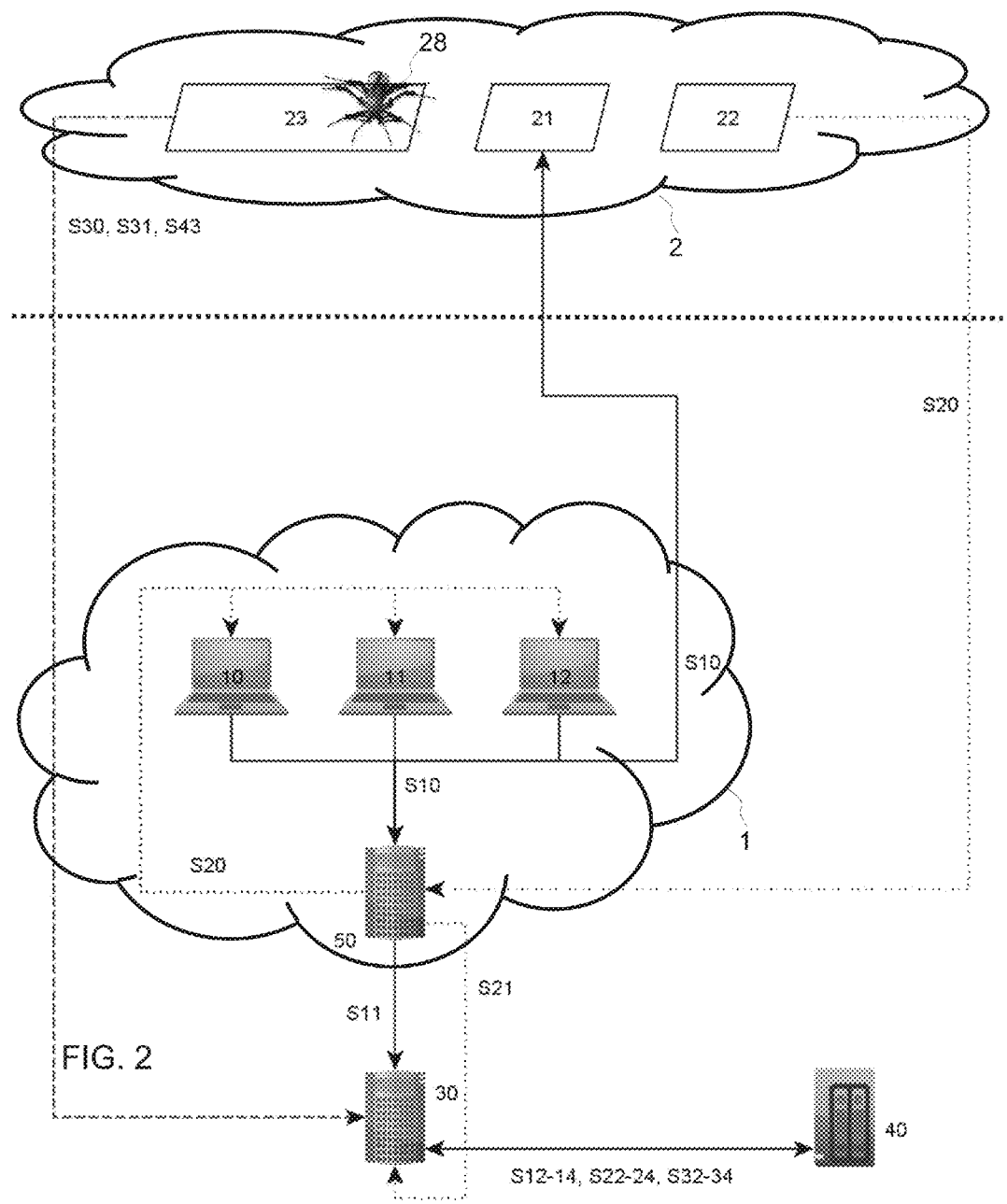
FIG. 2 is a block diagram schematically illustrating selected components of a private cloud and an external cloud, and representing some of the operations (steps) performed by these components, as involved in embodiments.

In reference to FIGS. 1 and 2, an aspect of the invention is first described, which concerns a method for synchronizing proprietary data 21 in an external cloud 2 (provided by a cloud service provider) with data of a private storage system 40.

Basically, this method revolves around the following steps, all performed at a synchronization system 30. First, the system 30 copies S11 outward data 21, i.e., it copies data from a flow of data 21 that are sent, or being sent, from a private cloud 1 to the external cloud 2. The outward data 21 are proprietary data of the entity, e.g., a company, a corporation, or an enterprise, etc., which owns data stored on or generated from the private cloud. Then, and in parallel to copying S11 outward data, the system 30 proceeds to compare S12, S13 outward data 21 that it previously copied with data as stored on the private storage system 40, to determine S13 whether the compared data 21 are already replicated in the private storage system. If the system 30 determines S13 that the compared data 21 are not yet replicated, it instructs S14 (or even proceeds) to store the compared data 21 on the private storage system 40.

In other words, the above scheme allows proprietary data sent to an external cloud to be synchronized with data stored in a private storage system. To that aim, a flow of data to be written to the external cloud 2 (and arising from the whole private cloud 1) are copied before being passed on to the external cloud, compared to already replicated data and stored on the private storage system if not already replicated thereon.

The above scheme establishes a basis for data synchronization for an enterprise cloud scenario. Of particular interest is that the data replication is not performed on a device and/or user level, but on the level of the whole private cloud 1, i.e., the data synchronized typically arise from multiple nodes 10-12 of the private cloud 1. Eventually, all outward proprietary data are replicated on the private storage system 40, which allows an easy migration to another external cloud, if necessary.

In embodiments such as described below in detail, the private storage system 40 may replicate most, if not all proprietary data beyond the sole outward data, as stored on the external cloud. These proprietary data belong to the same entity that owns the outward data, e.g., a company owing the private cloud or at least data generated therein. Proprietary data may further include data generated in the external cloud 2 on behalf of or for this entity.

The synchronization and storage systems 30, 40 may be part of the private cloud 1, or not (the latter case is assumed in FIG. 2, without prejudice); they are, however, not part of the external cloud 2. In addition, the systems 30, 40 are not controlled by those individual compute/storage nodes 10-12 of the private cloud 1 that write/read data 21, 22 to/from the external cloud 2. The private storage system 40 works, together with the synchronization system 30, on the level of the company or enterprise, which owns the data of the private cloud 1 as well as data maintained in the external cloud on its behalf. In that sense, the private synchronization and storage systems 30, 40 is independent from individual, data generating/consuming entities 10-12 of the private cloud 1. In practical embodiments, the private synchronization and storage systems 30, 40 are different functional units (one dedicated to data comparison, the other to data storage) of a same computerized unit.

The data comparison may be direct or indirect, e.g., it may use checksums, hash values or the like, of some data sequence, or a physical record, i.e., a sequence of bytes or bits, as well as metadata (filenames, pathnames, etc.). The data comparison algorithm may for instance compare consistent data sequences, e.g., data extents i.e., consecutive data fragments of fixed size, e.g., an extent being typically of 1 GB or, still, data fragments or data blocks. A fragment refers to a fixed size fraction of an extent and to a fixed size multiple of a block. Still, experiments performed by the present inventors has shown that comparisons performed at the block level provide good results in terms of efficiency vs. accuracy.

The comparison may for instance be done in parallel with sending/receiving data to/from the external cloud 2. As transmitted data typically belong to a file, present comparison algorithms may further try to locate whether the data is already stored on the private storage system 40 through the association of the data record send with the filename and the location in the file. For example, based on a filename of the copied data, the system 30 may try to locate a corresponding file on the private storage system 40. If the file does not exist, then it is created. If it exists, it is updated-in-place with the data copied.

In addition to (or independently from) such metadata, the comparison may use, e.g., hash values, checksum or even byte-by-byte comparison, as evoked above, to determine whether the copied data is identical to data already stored on the storage system 40 or whether data already stored data need be updated, replaced, or augmented with the copied data. The same basic operations as already known in, e.g., back-up systems, may be used to that aim. For data volume reduction, known methods for de-duplication can be applied.

More generally, the synchronization system 30 will, upon determining that the compared data are not replicated yet, instruct to store those data on the system 40. The decision as to whether to replicate missing data is made by the system 30, which is typically independent from the external cloud provider, for security, controllability and reliability purposes.

The system 30 works on the level of the private cloud, i.e., it copies data portions from continuous data flows being written to the external cloud to detect unreplicated data, rather than working on a single device-level. Namely, the outward data 21 copied S11 by the system 30 may originate from a flow of outward data 21 initially sent from several nodes 10-12 of the private cloud 1. This flow of data is continuously and independently sent by individual entities 10-12 of the private cloud 1. The system 30 may for instance copy such data from a data flow channeled by a gateway or, more generally, an IT system 50 of the private cloud 1, as assumed in FIG. 2. For example, the system 30 may mirror every write to the external cloud 2 from the private cloud 1, e.g., from a local IT system 50 thereof, to the local storage 40.

The system 30 does, however, not rely on intermittent connected operations. It preferably keeps local copies, i.e., reconciles cloud 2 and local 40 data without requiring detection of intermittent connections. In addition, it may be realized that the system 30 works differently from a versioned file system and its primary goal is not to ensure data back-up and retrieval, especially as the systems 30, 40 will typically not be visible from individuals 10-12, i.e., the enterprise client computers/devices 10-12.

As evoked earlier, the synchronization system 30 may implement a similar mechanism for inward data as the mechanism used for outward data. The inward data processing is now discussed in detail. As seen in FIGS. 1, 2, the synchronization system 30 may, in parallel to copying S11 outward data, copy S21 inward data 22 from a flow of inward data 22 read (or meant to be read), in the private cloud 1, back from the external cloud 2. Again, the inward data 22 are proprietary data of the same entity that owns the outward data 21, as well as data generally present in the private cloud 1. Next, and in parallel to copying S21 inward data: the system 30 proceeds to compare S22, S23 inward data 22 with data already stored on the private storage system 40, to determine S23 whether such data are already replicated therein. Eventually, if the system 30 determines S23 that the compared data 22 are not yet replicated, it instructs S24 or proceeds to store the compared data 22 on the storage system 40.

The system 30 thereby enables a two-way data synchronization between the private cloud 1 and the external cloud 2, at a cloud level and independently from the external cloud. Again, the comparison may involve filenames, hash values of data blocks, etc.

As for the outward mechanism, the inward data 22 copied S21 by the system 30 will typically originate from a flow of inward data 22 read (or meant to be read) back from the external cloud 2, at several nodes 10-12 in the private cloud 1. The system 30 may for instance copy such data from a data flow as channeled by a gateway or, more generally, a local IT system 50 of the private cloud 1.

Now, it may be realized that additional data may be indirectly generated in the external cloud 2, as per a policy applicable to the private cloud 1 or the entity who owns it, or indirectly due to some activity going on in the private cloud 1. Therefore, an additional mechanism may be needed at the external cloud 2.

Accordingly, in embodiments, the external cloud 2 may, in parallel to the monitoring mechanisms S11, S21 implemented at the system 30, monitor S41, S42 novel data 23 generated therein. The aim is to detect S42 novel data 23 generated in the external cloud 2 and by the external cloud 2, e.g., by some services provided by the external cloud provider. Again, the novel data 23 are assumed to be proprietary data of the same entity that owns the outward/inward data 21, 22. Upon detecting S42 such novel data 23, the external cloud will apprise S43 the system 30 of the detected novel data 23.

Step S43 may for instance comprises sending a copy of the detected novel data 23, for efficiency. Next, upon being apprised S31 of the novel data 23 by the external cloud 2, the synchronization system 30 may proceed to compare S32, S33 the novel data with data already stored on the private storage system 40, in essentially the same way it already does for outward/inward data 21, 22, for eventually replicating such data, if needed.

It should be reminded that the "novel data" 23 monitored are data being generated in the external cloud 2, and by the external cloud, e.g., by services including software, or software components provided by the provider of the external cloud 2. Thus, data 23 differ from outward data 21 directly written or sent to the external cloud by nodes 10-12 of the private cloud, which outward data 21 are already handled by the mechanism of steps S11-S14. Still, these novel data are proprietary data, e.g., data that may be written by services of the external cloud 2 on behalf of the enterprise. Such novel data may notably include data generated as per a cloud policy applicable to the private cloud 1 or the entity who owns it. In addition, they may also include data indirectly triggered by nodes 10-12 executing some programs in the private cloud, if such programs happen to activate services of the external cloud 2, while executing.

The external scheme S41-43 enables a new dimension in the file synchronization, going beyond a mere one-way or two-way synchronization. Indeed, as the external cloud 2 may cause to generate novel data 23, which are not part of the inward/outward data flows, an additional monitoring scheme is implemented, this time initiated at the level of the external cloud 2, to ensure that residual novel data 23 generated therein be suitably replicated at the private storage system 40 too. This additional mechanism is implemented in parallel to monitoring the flows of outward and inward data. Note that this additional mechanism is initially implemented at the external cloud 2 (steps S41-S43) but is completed at the systems 30, 40, steps S31-S34.

The additional monitoring S41 may be performed by a data crawler 28 (FIG. 2). The crawler 28 may for instance be provided as a service as part of cloud-based IT-services provided by the external cloud 2, to leverage the external cloud capability.

Note that the crawler does not necessarily have to distinguish residual novel data generated by the services of the external cloud 2 from data generated by the private cloud to perform the additional monitoring S41. Consider the following example. Assume that, through some computer activity, the external cloud 2 produces a file 'x.dat'. Eventually the crawler will discover the file 'x.dat' and send it to the system 30. The system 30 may then start a search for 'x.dat' in the private storage system 40. If the file is found (e.g., because some users in the private cloud happen to read the file 'x.dat' and by virtue of step S21 this was copied to the private storage system 40), it will not make a new copy. If, on the contrary, the file is not found (e.g., because no user of the private cloud has read the file 'x.dat' already) it will make a copy The, if later-on a user reads the file 'x.dat', the storage system 40 will already have a copy of this file.

Eventually, the storage system 40 may replicate most, if not all proprietary data. Thus, if the proprietary entity needs to change the external cloud 2 (and possibly the cloud provider), or to source back in (i.e., the proprietary entity stops using the external cloud 2 and works from now on only with its private cloud), etc., an easy migration will be made possible by merely using from now on the storage system 40 to source data which was before in the external cloud 2, or by replicating data stored on the private storage system 40 in the new external cloud. More generally, one may replicate data from the private storage system 40 each time the proprietary data need to return, at some point in time, back to the entity.

Practically, the replication is preferably done step-by-step. When moving to a new cloud provider, initially the system 40 may provide sourcing of the data that were with the old cloud provider. Such data will end-up, step-by-step, with the new cloud provider, as it was originally created within the external cloud 2 of the old cloud provider.

The storage system 40 may provide additional functionality in terms of sourcing. For example, the storage 40 may provide for automatic sourcing of data, if needed, e.g., For example, assume that a user works within an enterprise which relies on an initial external cloud provider and that the user starts a work contained in a file 'x.dat', which, for some reason, cannot be stored locally, e.g., because of the volume or the nature of the work, or because no local non-volatile storage is allowed for the user's workstation/laptop, etc. If the enterprise happens to switch cloud providers before the work at issue could safely be stored, there is a risk that the user cannot access anymore the latest version of his/her file 'x.dat'. However, before the switch to the new cloud-provider, the user has created and/or modified the file 'x.dat', which is normally stored at the site of the initial cloud provider. Hence, and by virtue of the present mechanisms, a copy of the latest version of this file 'x.dat' will be stored on the storage system 40. Thus, when the enterprise switches to a new cloud provider, the storage system 40 may be configured to provide automatic sourcing capability, such that, in the above example, the user be able to open his/her file 'x.dat', the latter sourced by the storage system 40. This is advantageous inasmuch as the former cloud provider is not operational anymore, whereas the file could not have been copied to the new cloud provider yet. The additional sourcing from storage 40 may even be done transparently for the user.

Next, and according to other aspects, the invention can be embodied as a data synchronization system, such as the system 30 depicted in FIG. 2 and evoked in FIG. 1. Such a system will be adequately configured, to enable data communication with the private (and external cloud if needed), to enable in turn synchronization operations as described above. The present invention may even be embodied as a private cloud 1, comprising such a system 30 and, if necessary, the private storage system 40. As discussed earlier, however, the systems 30, 40 may be managed by third parties (as assumed in FIG. 2). Finally, the invention may also be embodied as a computer program product, comprising instructions executable by the synchronization system 30. The systems 30 and, more generally, any computerized equipment, as well as computer program product needed to implement embodiments of the invention are discussed in detail in the next section.

2. Specific Embodiments/Technical Implementation Details 2.1 Computerized Units and Systems Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, partly interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

Figure 3:
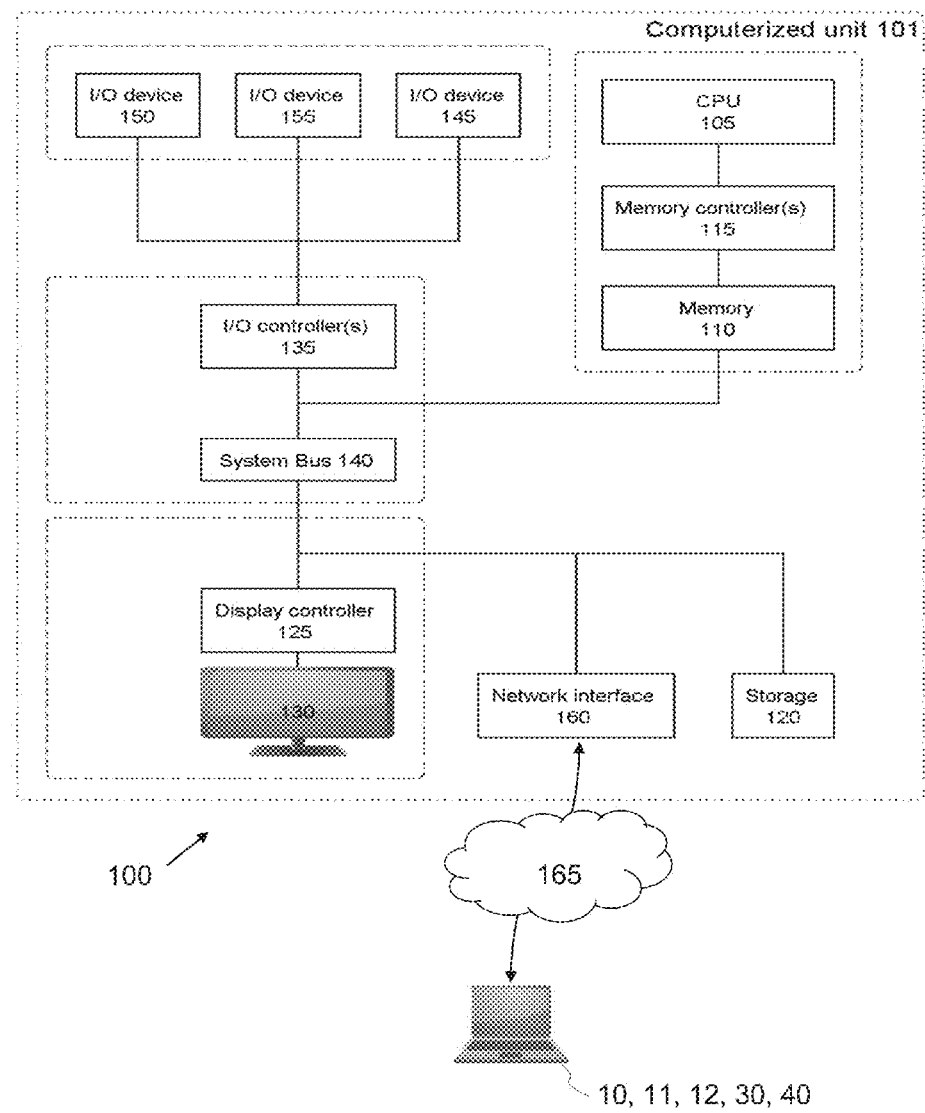
FIG. 3 schematically represents a general-purpose computerized system that may be used in place or as part of the computerized components shown in FIG. 2, as involved in embodiments of the invention.

For instance, the system 100 depicted in FIG. 3 schematically represents a computerized unit 101, e.g., a general-purpose computer, which may be used in place or as part of any or each of the units 10-12, 30 or 40 depicted in FIG. 2.

In exemplary embodiments, in terms of hardware architecture, as shown in FIG. 3, the unit 101 includes a processor 105, memory 110 coupled to a memory controller 115, and one or more input and/or output (I/O) devices 140, 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 3, the software in the memory 110 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 140-155 may include other hardware devices.

In addition, the I/O devices 140-155 may further include devices that communicate both inputs and outputs. The system 100 can further include a display controller 125 coupled to a display 130. In exemplary embodiments, the system 100 can further include a network interface or transceiver 160 for coupling to a network 165, to enable, in turn, data communication to/from components 10, 11, 12, 30, 40, such as described and subject to provisos described in the previous section. More generally, the network 165 may provide communication infrastructure for part or all communications within/to/from the clouds 1 and 2.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

2.2 Computer Program Products

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The invention claimed is:

1. A computer-executed method for synchronizing proprietary data in an first cloud computing system comprising networked computer resources provided by a cloud service provider with data of a private data storage system, the method comprising:

copying, by a processor of a computer, outward data from a continuous flow of outward data to be sent from one or more data generating and consuming computer nodes of a second cloud computing system to the first cloud computing system, the outward data being proprietary data of an entity that owns data of the second cloud computing system; and in parallel to copying outward data at the first computer:

comparing, by said processor, consecutive fixed size blocks of copied outward data of said continuous flow at a second cloud computing system level with data stored on the private data storage system, to determine whether the compared outward data are already replicated in the private data storage system; and if it is determined that the compared outward data are not yet replicated in the private data storage system, storing, by said processor, the compared outward data on the private data storage system, and wherein said copying of outward data is controlled by said processor, independent of said one or more data generating and consuming computing nodes of said second cloud computing system and without requiring detection of intermittent connections;

copying, using the processor of the first computer, inward data from a continuous flow of inward data to be read, in the one or more data generating and consuming computer nodes of said second cloud computing system, back from the first cloud computing system, the inward data being proprietary data of a same entity that owns said outward data;

and in parallel to copying inward data at the first computer:

comparing, using the processor, consecutive fixed size blocks of copied inward data of said continuous flow at a second cloud computing system level with data already stored on the private storage system, to determine whether the compared inward data are already replicated in the private data storage system; and if it is determined that the compared inward data are not yet replicated in the private data storage system, storing, by said processor, the compared inward data on the private data storage system, said copying of inward data controlled by said processor, independent of said one or more data generating and consuming computing nodes of said second cloud computing system and without requiring detection of intermittent connections; and determining, by said processor, a change from use of said second cloud computing system to a use of a further cloud computing system; and replicating, by the processor, data stored on said private data storage system in said further cloud computing system.

2. The computer-executed method of claim 1, further comprising, at the second cloud computing system and in parallel to the copying of outward data:

monitoring data to detect novel data generated at the second cloud computing system, the novel data being proprietary data of a same entity that owns said outward data; and upon detecting novel data, notifying the processor of said computer of the detected novel data.

3. The computer-executed method of claim 2, further comprising:

sending a copy of the detected novel data to the processor of said computer.

4. The computer-executed method of claim 2, further comprising:

upon receiving by the processor notification of the novel data by the second cloud computing system, comparing, by the processor, the novel data with data already stored on the private data storage system, to determine whether the compared novel data are already replicated in the private data storage system; and if it is determined that the compared novel data are not yet replicated in the private data storage system, storing the compared novel data on the private data storage system.

5. The computer-executed method of claim 2, wherein said monitoring of the novel data is performed by a data crawler.

6. The computer-executed method of claim 5, wherein the data crawler used to monitor the novel data is, or is part of, a cloud-based service run at the first cloud computing system.

7. The computer-executed method of claim 1, wherein the second cloud computing system is owned by the same entity that owns data of the second cloud computing system.

8. The computer-executed method of claim 1, wherein the processor of the computer is part of the first cloud computing system.

9. A data synchronization system for synchronizing enterprise data in a first cloud computing system comprising networked computer resources provided by a cloud service provider with data of a private data storage system, wherein the system comprises:
a processor;
a memory coupled to the processor, the memory comprising computer-readable instructions which when executed by the processor, cause the processor to:
copy outward data from a continuous flow of outward data being sent from one or more data generating and consuming computer nodes of a second cloud computing system to the first cloud computing system, the outward data being proprietary data; and
in parallel to the copying outward data:
  comparing consecutive fixed size blocks of copied outward data of said continuous flow at a second cloud computing system level with data stored on the private data storage system, to determine whether the compared outward data are already replicated in the private data storage system; and
  if it is determined that the compared outward data are not yet replicated in the private storage system, storing the compared outward data on the private storage system, and, wherein said copying of outward data is controlled by said processor, independent of said one or more data generating and consuming computing nodes of said second cloud computing system and without requiring detection of intermittent connections; and
wherein the computer-readable instructions when executed by the processor further cause the processor to: in parallel to the copying said outward data:
copy inward data from a continuous flow of inward data read, in the one or more data generating and consuming computing nodes of said second cloud computing system, back from the first cloud computing system, the inward data being proprietary data;
compare consecutive fixed size blocks of copied inward data of said continuous flow at a second cloud computing system level with data already stored on the private data storage system, to determine whether the compared inward data are already replicated in the private data storage system; and
if it is determined that the compared inward data are not yet replicated in the private data storage system, store the compared inward data on the private data storage system, said copying of inward data controlled by said processor, independent of said one or more data generating and consuming computing nodes of said second cloud computing system and without requiring detection of intermittent connections; and the computer-readable instructions when executed by the processor further cause the processor to:
determine a change from use of said second cloud computing system to a use of a further cloud computing system; and
replicate data stored on said private data storage system in said further cloud computing system.

10. The data synchronization system of claim 9, wherein the computer-readable instructions when executed by the processor further cause the processor to: in parallel to copying both outward data and inward data:
receive novel data from the first cloud computing system, the novel data being proprietary data generated at the first cloud computing system;
compare the novel data with data already stored on the private data storage system, to determine whether the compared novel data are already replicated in the private data storage system; and
if it is determined that the compared novel data in said copy are not yet replicated in the private data storage system, store the compared novel data on the private data storage system.

11. A private cloud computing system comprising:
several data generating and consuming computing nodes, each computing node comprising:
  a first processor;
  a memory coupled to the first processor, the memory comprising computer-readable instructions which when executed by the first processor, cause the first processor to:
  send proprietary data as a continuous flow of outward data to an external cloud computing system provided by a cloud service provider; and receive proprietary data as a continuous flow of inward data from the external cloud computing system;
a private data storage system for storing enterprise data; and
a data synchronization system comprising a second processor; and a memory coupled to the second processor, the memory comprising computer-readable instructions which when executed by the second processor, cause the second processor to:
  copy proprietary data sent to and received as continuous outward data and inward data flows from the external cloud computing system by the data generating and consuming computing nodes to the private data storage system, said copying of outward data and inward data controlled by said second processor independent of said one or more data generating and consuming computing nodes of said second cloud computing system and without requiring detection of intermittent connections;
  receive, from a processor running a data monitoring program at the external cloud computing system, novel proprietary data generated at the external cloud computing system;
  compare the novel proprietary data with data already stored on the private storage system, to determine whether the compared novel data are already replicated in the private storage system; and
  if it is determined that the compared novel data in said copy are not yet replicated in the private storage system, store the compared novel data on the private storage system, and
  determine, by said second processor, a change from use of said external cloud computing system to a use of a further cloud computing system; and replicate, using said second processor, data stored on said private data storage system in said further cloud computing system.

12. A computer program product for synchronizing proprietary data in an first cloud computing system comprising networked computer resources provided by a cloud service provider with data of a private data storage system, the computer program product comprising a non-transitory computer readable storage medium having program instructions embodied therewith, the program instructions executable by a computer to cause the computer to:

copy outward data from a continuous flow of outward data sent from one or more data generating and consuming computer nodes of a second cloud computing system to the first cloud computing system, the outward data being proprietary data of an entity that owns data of the second cloud computing system; and in parallel to copying outward data:

compare consecutive fixed size blocks of copied outward data of said continuous flow at a second cloud computing system level with data stored on the private data storage system, to determine whether the compared outward data are already replicated in the private data storage system; and if it is determined that the compared outward data are not yet replicated in the private data storage system, store the compared outward data on the private data storage system, and wherein said copying of outward data is controlled by a processor, independent of said one or more data generating and consuming computing nodes of said second cloud computing system and without requiring detection of intermittent connections; and the program instructions are further executable by the computer to cause the computer to, in parallel to copying outward data:

copy inward data from a continuous flow of inward data read, in the one or more data generating and consuming computer nodes of said second cloud computing system, back from the first cloud computing system, the inward data being proprietary data; and in parallel to copying inward data:

compare consecutive fixed size blocks of copied inward data of said continuous flow at a second cloud computing system level with data already stored on the private data storage system, to determine whether the compared inward data are already replicated in the private data storage system; and if it is determined that the compared inward data are not yet replicated in the private data storage system, store the compared inward data on the private data storage system, said copying of inward data controlled by said processor, independent of said one or more data generating and consuming computing nodes of said second cloud computing system and without requiring detection of intermittent connections; and the computer-readable instructions when executed by the computer further cause the computer to:

determine a change from use of said second cloud computing system to a use of a further cloud computing system; and replicate data stored on said private data storage system in said further cloud computing system.

13. The computer program product of claim 12, wherein the program instructions are further executable by the computer to cause the computer to, in parallel to copying outward data:

receive novel data from the external cloud computing system, the novel data being proprietary data generated at the external cloud computing system, compare the novel data with data already stored on the private storage system, to determine whether the compared novel data are already replicated in the private storage system; and if it is determined that the compared novel data in said copy are not yet replicated in the private storage system, store the compared novel data on the private storage system.

* * * * *